(12) United States Patent
Kim

(10) Patent No.: US 8,327,498 B2
(45) Date of Patent: Dec. 11, 2012

(54) WIPER BLADE WITH FRAME

(75) Inventor: In Kyu Kim, Gyeonggi-do (KR)

(73) Assignees: ADM21 Co., Ltd. (KR); In Kyu Kim (KR)

( * ) Notice: Subject to any disclaimer, the term of this patent is extended or adjusted under 35 U.S.C. 154(b) by 1439 days.

(21) Appl. No.: 11/565,513

(22) Filed: Nov. 30, 2006

(65) Prior Publication Data

US 2007/0175017 A1    Aug. 2, 2007

(30) Foreign Application Priority Data

Nov. 30, 2005  (KR) .................. 10-2005-0115734

(51) Int. Cl.
*B60S 1/38* (2006.01)
*B60S 1/40* (2006.01)

(52) U.S. Cl. ........... 15/250.201; 15/250.361; 15/250.32; 15/250.43

(58) Field of Classification Search ................ 15/250.43, 15/250.44, 250.451, 250.361, 250.201, 250.32, 15/250.48
See application file for complete search history.

(56) References Cited

U.S. PATENT DOCUMENTS

| | | | | |
|---|---|---|---|---|
| 2,767,419 A | * | 10/1956 | Horton | 15/250.451 |
| 3,035,298 A | * | 5/1962 | Scinta | 15/250.452 |
| 3,060,480 A | | 10/1962 | Ziegler | 15/250.42 |
| 3,114,926 A | | 12/1963 | Deibel | 15/250.42 |
| 3,132,368 A | * | 5/1964 | Reese | 15/250.451 |
| 3,141,186 A | | 7/1964 | Scinta | 15/250.42 |
| 3,643,286 A | | 2/1972 | Wubbe | 15/250.38 |

(Continued)

FOREIGN PATENT DOCUMENTS

DE      19854372   *  5/2000

(Continued)

OTHER PUBLICATIONS

Kim, "Wiper Blade," Office Action mailed Aug. 4, 2010, for U.S. Appl. No. 11/565,527, 13 pages.

*Primary Examiner* — Gary Graham
(74) *Attorney, Agent, or Firm* — Seed IP Law Group PLLC

(57) ABSTRACT

The present invention relates to a wiper blade mounted to a wiper apparatus for a vehicle to wipe a windshield, a jig for heat treating a wiper frame of a wiper blade, and a method for machining a wiper frame using the same. An object of the present invention is to provide a wiper blade, which has a wiper frame formed to have elasticity, has an improved structure for securing a wiper strip, causes a wiper strip to be directly coupled with the wiper frame, and is easily assembled, thereby saving a time required for an assembling process and having improved durability and contacting force, a jig for heat treating a wiper frame of a wiper blade and a method for machining a wiper frame using the same. According to the present invention for achieving the object, there is provided a wiper blade for wiping a windshield, comprising a wiper strip in contact with the windshield, the wiper strip having rail grooves formed on both sides thereof; a wiper frame curved along its lengthwise direction and having elasticity to bring the wiper strip into contact with the windshield; a coupling slit formed in the wiper frame, the rail grooves of the wiper strip being slidably fitted to the coupling slit; and a coupling aperture formed in one end of the coupling slit and allowing the wiper strip to be inserted thereinto.

10 Claims, 7 Drawing Sheets

U.S. PATENT DOCUMENTS

| | | | |
|---|---|---|---|
| 4,063,328 A * | 12/1977 | Arman | 15/250.43 |
| 4,075,731 A | 2/1978 | Harbison et al. | |
| 4,336,625 A * | 6/1982 | Maiocco | 15/250.451 |
| 4,343,063 A * | 8/1982 | Batt | 15/250.451 |
| 5,231,730 A | 8/1993 | Schmid et al. | 15/250.42 |
| 5,970,569 A * | 10/1999 | Merkel et al. | 15/250.43 |
| D443,854 S | 6/2001 | De Block | |
| 6,266,843 B1 * | 7/2001 | Doman et al. | 15/250.201 |
| 6,279,191 B1 | 8/2001 | Kotlarski et al. | 15/250.201 |
| 6,799,348 B1 | 10/2004 | Swanepoel et al. | 15/250.32 |
| 6,810,556 B1 * | 11/2004 | Kotlarski | 15/250.43 |
| 6,836,926 B1 | 1/2005 | De Block | 15/250.43 |
| 7,007,339 B2 | 3/2006 | Weiler et al. | 15/250.201 |
| D524,223 S | 7/2006 | Nakano et al. | |
| 2004/0159994 A1 | 8/2004 | Lenzen et al. | 267/229 |
| 2006/0064840 A1 * | 3/2006 | Park | 15/250.43 |
| 2006/0090281 A1 * | 5/2006 | Park | 15/250.43 |
| 2006/0191093 A1 | 8/2006 | Boland et al. | |
| 2007/0180642 A1 | 8/2007 | Kim | 15/250.201 |
| 2007/0180643 A1 | 8/2007 | Kim | 15/250.201 |

FOREIGN PATENT DOCUMENTS

| | | | |
|---|---|---|---|
| DE | 10107021 | | 8/2002 |
| DE | 101 30 137 | | 1/2003 |
| DE | 202004012132 | | 11/2004 |
| DE | 103 30 702 | | 1/2005 |
| EP | 0436510 | | 7/1991 |
| EP | 0 442 036 | | 8/1991 |
| EP | 1132267 | * | 2/2001 |
| EP | 1757502 | | 2/2007 |
| FR | 2804393 | | 8/2001 |
| GB | 949337 | | 2/1964 |
| WO | 9902382 A1 | | 1/1999 |
| WO | 99/12784 | | 3/1999 |
| WO | 9911495 A1 | | 3/1999 |
| WO | 99/15384 | | 4/1999 |
| WO | 00/37293 | | 6/2000 |
| WO | 0102224 A1 | | 1/2001 |
| WO | 0123232 A1 | | 4/2001 |
| WO | 02/04268 | | 1/2002 |
| WO | 02/36397 | | 5/2002 |

* cited by examiner

WIPER BLADE WITH FRAME

PRIORITY INFORMATION

This application claims priority to Korean Patent Application No. 10-2005-0115734, filed Nov. 30, 2005, entitled WIPER BLADE, JIG FOR HEAT TREATING WIPER FRAME OF WIPER BLADE AND METHOD FOR MACHINING WIPER FRAME USING THE SAME, which application is incorporated herein by reference in its entirety.

TECHNICAL FIELD

The present invention relates to a wiper blade mounted to a wiper apparatus for a vehicle to wipe a windshield, a jig for heat treating a wiper frame of a wiper blade, and a method for machining a wiper frame using the same, and more particularly, to a wiper blade of which a wiper frame is elastic and is mounted with a wiper strip to have a simple structure and be easily assembled, a jig for heat treating a wiper frame of a wiper blade and a method for machining a wiper frame using the same.

BACKGROUND

FIG. 1 is a perspective view of a vehicle to which a conventional wiper blade is mounted, and FIG. 2 is a front view of the conventional wiper blade.

As shown in FIG. 1 and FIG. 2, the conventional wiper apparatus comprises a wiper arm 15 installed at one side of a vehicle body 10 and rotated from side to side by a wiper motor (not shown), and a wiper blade 20 mounted to the wiper arm 15, moved on and contacted with a windshield 12 to wipe it, and provided with a wiper strip 30.

The wiper blade 20 is coupled with the wiper arm 15 and is rotated within a predetermined angle range according to operation of the wiper motor. To this end, a main link 22 of the wiper blade 20 is coupled with the wiper arm 15. A plurality of intermediate links 24 are connected to the main link 22 through pins 25 for uniformly transmitting pressure of the wiper arm 15 to the main link 22. A plurality of sub links 26 are connected to the intermediate links 24 with pins 27 to connect the intermediate links 24 to the wiper strip 30. Also, clips 28 are formed at both ends of the sub link 26 and coupled with coupling grooves formed in the wiper strip 30.

Further, the wiper blade 20 is provided with a joint 29 to reduce a friction force between the main link 22 and the intermediate links 24.

In the wiper blade according to the prior art, however, a process of assembling a wiper strip as well as a structure for securing it are complicated, whereby there is a problem in that a time required for assembling the wiper blade is increased to lower a productivity of the articles. Also, in the conventional wiper blade, since the links are moved relative to each other when the wiper blade is operated, noises can be generated in the operation of the wiper blade. In addition, in the conventional wiper blade, the wiper blade is lifted up from the windshield by the wind when the vehicle is driven at a high speed, which causes a contacting force between the wiper blade and the windshield to be lowered. Accordingly, in order to solve the above problem, the structure in which an additional windbreak rib is provided on the main link has been proposed. However, a complete solution has not been proposed, so that there is a room for improvement of the wiper blade.

Technical Problem

The present invention is conceived to solve the aforementioned problems in the prior art. An object of the present invention is to provide a wiper blade, which has a wiper frame formed to have elasticity, has an improved structure for securing a wiper strip, causes a wiper strip to be directly coupled with the wiper frame, and is easily assembled, thereby saving a time required for an assembling process and having improved durability and contacting force, a jig for heat treating a wiper frame of a wiper blade and a method for machining a wiper frame using the same.

Technical Solution

According to an aspect of the present invention for achieving the object, there is provided a wiper blade for wiping a windshield, comprising a wiper strip in contact with the windshield, the wiper strip having rail grooves formed on both sides thereof; a wiper frame curved along its lengthwise direction and having elasticity to bring the wiper strip into contact with the windshield; a coupling slit formed in the wiper frame, the rail grooves of the wiper strip being slidably fitted to the coupling slit; and a coupling aperture formed in one end of the coupling slit and allowing the wiper strip to be inserted thereinto. Here, the wiper frame may have at least one coupling slit and the wiper strip may be formed corresponding to the coupling slit. In addition, any one of a through-hole and a protrusion may be formed between the coupling slits, and then, the other one of the through-hole and the protrusion may be formed in an upper end of the wiper strip to be inserted thereinto. Further, the wiper blade may comprise an auxiliary slit which is connected to an end of the coupling aperture and formed collinearly with the coupling slit. In addition, the coupling aperture that is connected to the coupling slit may be formed to be inclined in the fitting direction of the wiper strip. In the meantime, the wiper blade may further comprise a connector provided at one side of the wiper frame to be coupled with the wiper arm. Preferably, the wiper frame may be formed with a seating portion for guiding a connecting position of the connector. In addition, the wiper frame may be configured such that an area of one side of the wiper frame is increased as it goes to its center. Further, in a case where the wiper frame is arranged to be inclined at a predetermined angle, the wiper strip may be formed to be inclined with respect to the wiper frame to be brought into perpendicular contact with the windshield. Also, the connector to be coupled with the wiper frame may be formed to be inclined in the direction opposite to the inclination direction of the wiper frame.

According to another aspect of the present invention for achieving the object, there is provided a jig for heat treating a wiper frame of a wiper blade, comprising a first jig provided with a first working surface having a predetermined curvature to press an upper portion of a wiper frame workpiece; a second jig arranged opposite to the first jig and provided with a second working surface having a curvature corresponding to the first working surface to press a lower portion of the wiper frame workpiece; and a press for pressing the first and second jigs to form the wiper frame workpiece disposed between the first and second jigs.

Further, the first and second jigs may be provided with a heating means. Furthermore, the jig may further comprise an auxiliary jig disposed between a plurality of wiper frame workpieces placed between the first and second jigs, the auxiliary jig having a curvature corresponding to the first and second working surfaces.

According to a further aspect of the present invention for achieving the object, there is provided a method for manufacturing a wiper frame of a wiper blade, comprising the steps of heat treating a workpiece made of steel to obtain martensite; blanking the workpiece heat treated in the heat treating step to prepare a wiper frame workpiece for a wiper blade; piercing the wiper frame workpiece prepared in the blanking step to remove an unnecessary portion from the wiper frame workpiece; bending the wiper frame workpiece to be formed to have a predetermined curvature; and heat treating and forming the wiper frame workpiece to have a desired curvature by pressing it and simultaneously to relieve internal stress thereof through annealing.

Also, the step of heat treating may comprise the steps of heating the wiper frame workpiece at a transformation temperature or more; and rapidly cooling the wiper frame workpiece heated in the heating step.

Advantageous Effects

According to a wiper blade, a jig for heat treating a wiper frame of a wiper blade and a method for machining a wiper frame using the same of the present invention configured as above, there are the advantages in that a structure of a wiper frame for securing a wiper strip is simple, a process of assembling the wiper strip to the wiper frame is simple, a time required for the assembling process can be reduced, and the manufacturing costs can be remarkably reduced and the durability of the article can be significantly improved since the wiper frame is formed to have predetermined elasticity and therefore no additional part is necessary. It is also possible to form a plurality of wiper frames in a short time using the jig for heat treating a wiper frame.

EXPLANATION OF REFERENCE NUMERALS FOR MAJOR PORTIONS SHOWN IN DRAWINGS

| | |
|---|---|
| 50: | Wiper Blade |
| 60: | Wiper Strip |
| 62: | Body portion |
| 64: | Upper End portion |
| 65: | Rail Groove |
| 68: | Strip portion |
| 69: | Cut-out portion |
| 70: | Wiper Frame |
| 74: | Coupling Aperture |
| 76: | Coupling Slit |
| 78: | Auxiliary Coupling Slit |
| 80: | Connector |

DETAILED DESCRIPTION

Hereinafter, preferred embodiments of the present invention will be described in more detail with reference to accompanying drawings.

Figure 3:
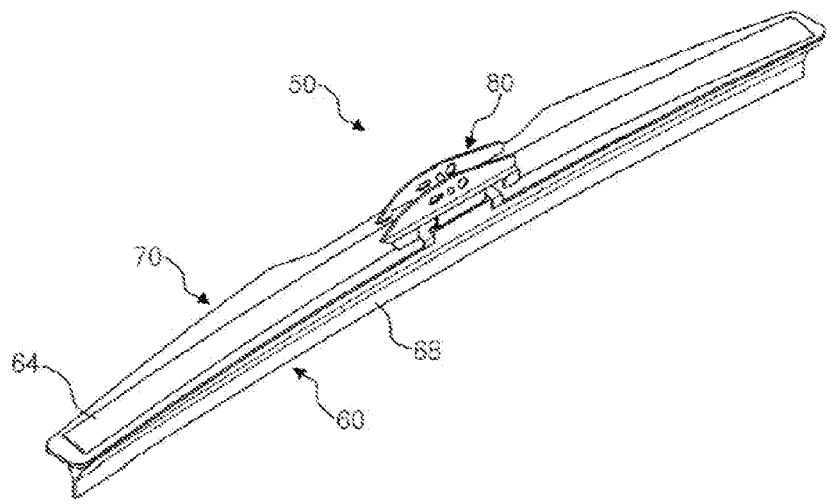
FIG. 3 is a perspective view of a wiper blade according to the present invention.
Figure 4:
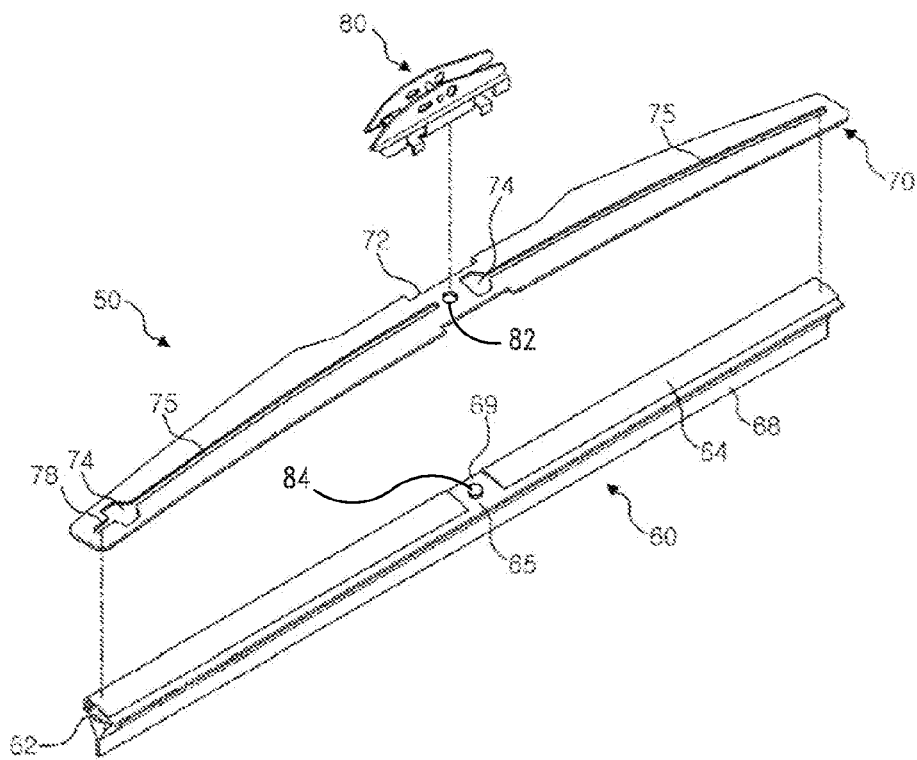
FIG. 4 is an exploded perspective view of the wiper blade according to the present invention.
Figure 6:
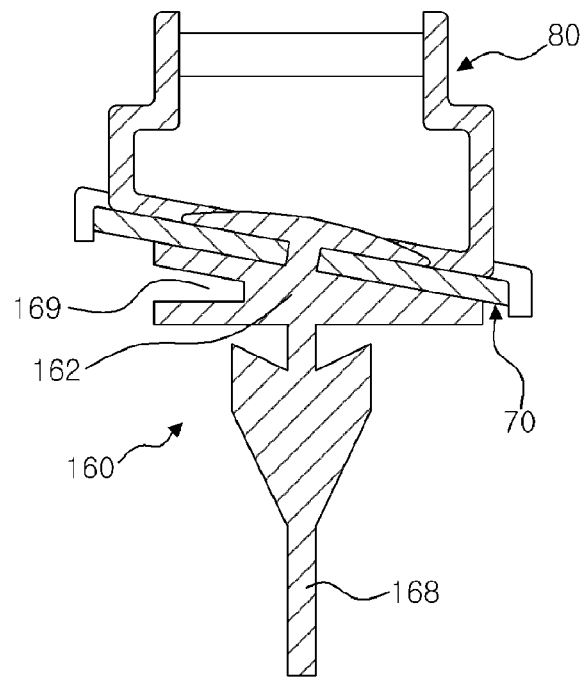
FIG. 6 is a sectional view of the wiper blade according to the present invention.
Figure 7:
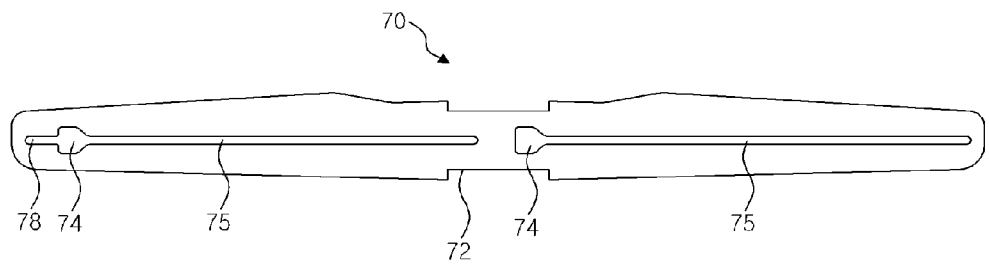
FIG. 7 is a plane view of a wiper frame of the wiper blade according to the present invention.

FIG. 3 is a perspective view of a wiper blade according to the present invention, and FIG. 4 is an exploded perspective view of the wiper blade according to the present invention. Also, FIGS. 5(*a*) and (*b*) are sectional views of a wiper strip of the wiper blade according to the present invention, FIG. 6 is a sectional view of the wiper blade according to the present invention, and FIG. 7 is a plane view of a wiper frame of the wiper blade according to the present invention.

As shown in FIGS. 3 to 7, a wiper blade 50 according to the present invention comprises a wiper strip 60 in contact with a surface of a windshield to wipe out moisture, dust and the like got on the surface of the windshield, and a wiper frame 70 with which the wiper strip 60 is coupled.

Figure 5:
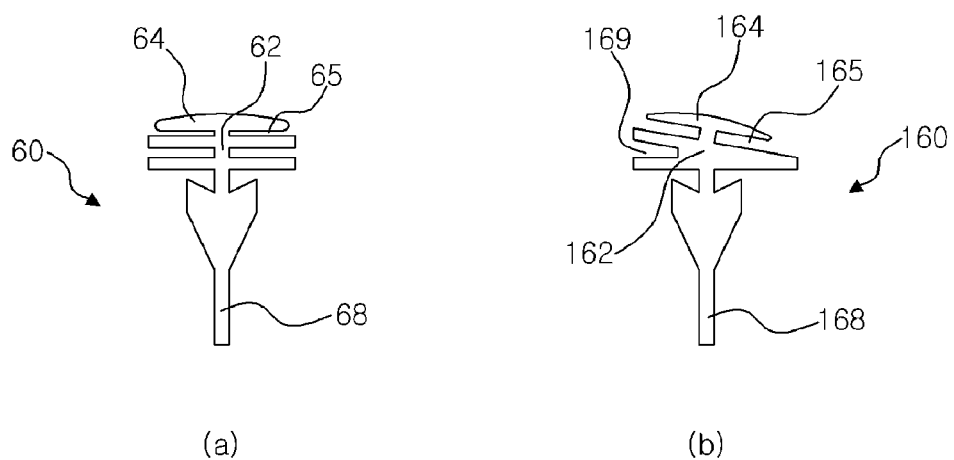
FIGS. 5(*a*) and (*b*) are sectional views of a wiper strip of the wiper blade according to the present invention.

As shown in FIG. 5(*a*), the wiper strip 60 includes a body portion 62, rail grooves 65 formed in an upper end portion 64 of the body portion 62 to be opened to both sides, and a strip portion 68 formed in a lower end portion of the body portion 62 to be brought into contact with a surface of a windshield.

The wiper frame 70 exerts a certain elastic force to the wiper strip 60 such that the wiper strip 60 is brought into close contact with a windshield 12. To this end, as shown in FIG. 7, the wiper frame 70 is made of a thin metal plate and is formed to be curved along the lengthwise direction. Also, the wiper frame 70 comprises coupling slits 75 extending in the lengthwise direction. At this time, each coupling slit 75, which is a structure for coupling the wiper strip 60 thereto, has a predetermined width such that the rail grooves 65 of the wiper strip 60 can be fitted to the coupling slit.

In addition, a coupling aperture 74 is formed at one end of each coupling slit 75 so that a portion of the upper end portion 64 of the wiper strip 60 can be disposed in the coupling aperture in order to fit the rail grooves 65 of the wiper strip 60 to the coupling slit.

An end of the coupling aperture 74 connected to the coupling slit 75 is formed to be inclined in the fitting direction of the wiper strip 60, and thus guides so that the rail grooves 65 of the wiper strip 60 are fitted to the coupling slit 75.

In the meantime, only one of the coupling slits 75 may be formed in the wiper frame 70. However, it is preferred that a plurality of coupling slits be successively formed in order to maintain the rigidity of the wiper frame 70 and make it easy to couple the wiper strip 60 thereto. Also, the wiper strip 60 is formed such that its upper end portion corresponds to the coupling slits 75 of the wiper frame 70. That is, a cut-out portion 69 is formed in the upper end portion 64 of the wiper strip 60 by cutting out a part of the upper end portion 64 corresponding to a portion in which the coupling slit 75 is not formed.

Also, when the plurality of coupling slits 75 are formed in the wiper frame 70 as described above, a through-hole 82 may be formed between the coupling slits 75. In addition, a protrusion 84 may be formed on the upper end portion of the wiper strip 60, to be inserted into the through-hole 82 of the wiper frame 70. Accordingly, as the protrusion 84 of the wiper strip 60 is inserted into the through-hole 82 of the wiper frame 70, the wiper strip 60 and the wiper frame 70 are fixedly coupled. In the embodiment of the present invention, although it is described that the through-hole is formed in the wiper frame 70 and the protrusion corresponding to this through-hole is formed on the wiper strip 60, it is possible to form a protrusion on the wiper frame 70 and a through-hole in the upper end portion of the wiper strip 60. In addition, a plurality of the through-holes or protrusions may be formed, and a shape of the through-hole or protrusion may be variously modified.

Also, an auxiliary coupling slit 78 is formed in the wiper frame 70 to be connected to the other end of the coupling aperture 74. The auxiliary coupling slit 78 is formed collinearly with the coupling slit 75 and fitted to the rail grooves 65 formed in an end of the wiper strip 60. To this end, the other end of the wiper strip 60 is fitted to the coupling slits 75 via the coupling aperture 74, and then, the one end of the wiper strip 60 is inserted into the coupling aperture 74 by compressing the one end of the wiper strip 60. At this time, once the compression force exerted on the wiper strip 60 is removed, the rail grooves 65 formed at the one end of the wiper strip 60 is fitted to the auxiliary coupling slit 78.

Figure 1:
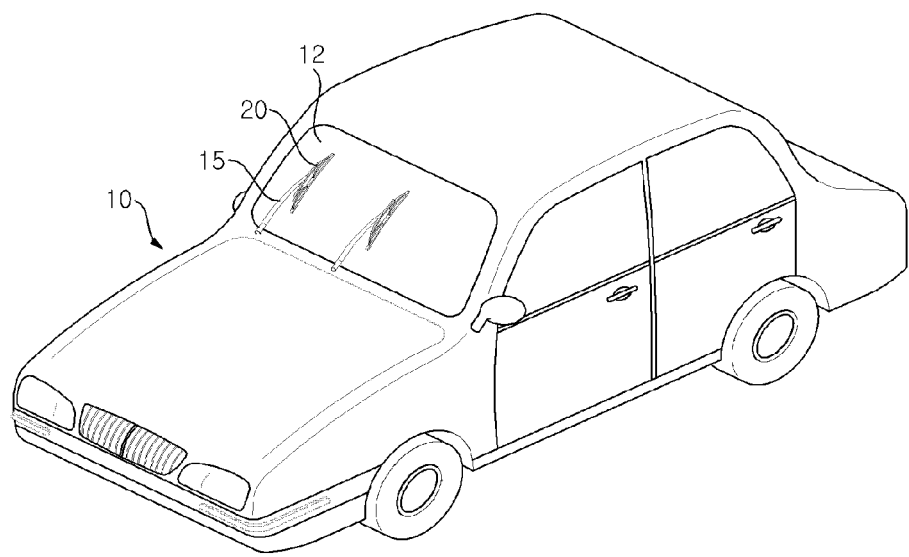
FIG. 1 is a perspective view of a vehicle to which a conventional wiper blade is mounted.
Figure 2:
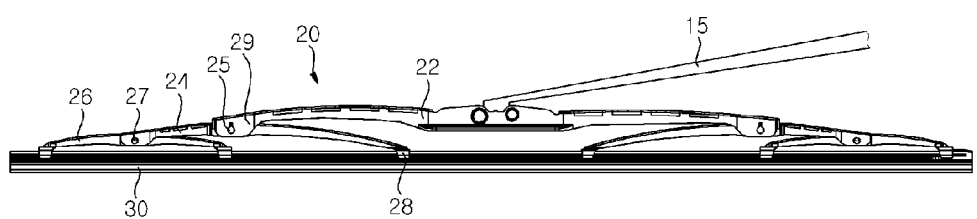
FIG. 2 is a front view of the conventional wiper blade.

In the meanwhile, a connector 80 is installed to a portion of the wiper frame 70 to couple the wiper frame to a wiper arm 15 (FIG. 1). Preferably, a seating portion 72 may be formed in the portion of the wiper frame 70 to guide a connecting position of the connector 80. The seating portion 72 may comprises a step section which may be formed to have the length and width corresponding to a coupling section of the connector 80. In addition, in order to increase the area which is exposed to wind, an area of a side of the wiper frame 70 is increased as it goes to its center. At this time, a central portion of the side of the wiper frame 70 of which the area is increased is partially cut out in order to couple the wiper frame with the connector 80.

In the meantime, the wiper frame 70 may be arranged slantingly to be inclined at a predetermined angle in order to bring the wiper strip 60 into more close contact with the windshield by the wind. When the wiper frame 70 is arranged to be inclined as described above, the wiper strip 60 is formed to be inclined with respect to the wiper frame 70 so as to be brought into perpendicular contact with the windshield.

To this end, as shown in FIG. 5(b), a wiper strip 160 has a body portion 162, rail grooves 165 formed in an upper end portion of the body portion 162 to be opened to both sides, a strip portion 168 formed in a lower end portion of the body portion 162 to be brought into contact with a surface of a windshield. At this time, the body portion 162 may be formed in an inclined wedge shape and a groove section 169 (←168) may be formed in a portion of the body portion 162 in order to reduce the weight and material cost of the wiper strip.

Also, when the wiper frame 70 is arranged to be inclined as described above, the connector 80 is formed to be inclined in the direction opposite to the inclination direction of the wiper frame 70 in order to couple the connector 80 with the wiper arm 15 (FIG. 1).

In the meantime, the wiper frame 70 configured as described above is formed through a jig for heat treating a wiper frame to have a predetermined curvature by machining a wiper frame workpiece made of steel.

Figure 8:
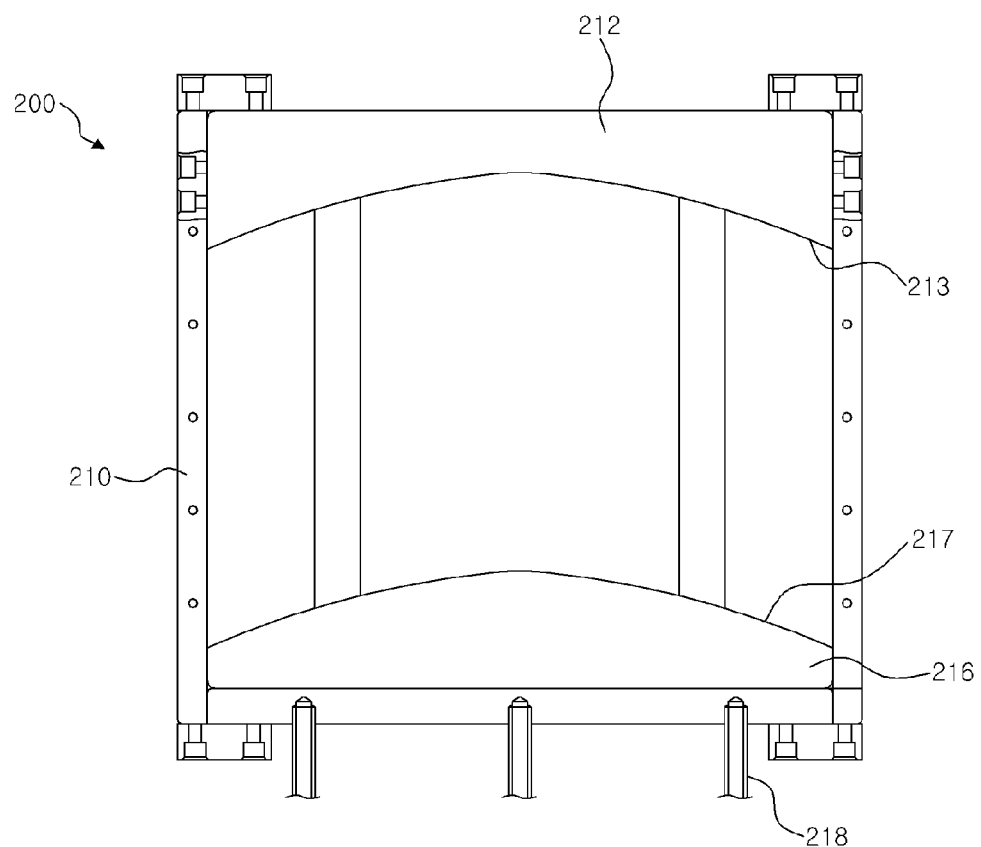
FIG. 8 is a plane view schematically showing a jig for heat treating a wiper frame according to the present invention.

FIG. 8 is a plane view schematically showing a jig for heat treating a wiper frame according to the present invention.

As shown in FIG. 8, in a jig 200 for heat treating a wiper frame according to the present invention, a first jig 212 provided with a first working surface 213 having a predetermined curvature and a second jig 216 provided with a second working surface 217 having a predetermined curvature corresponding to the first working surface 213 are arranged opposite to each other at both ends of the jig 200.

The first jig 212 and the second jig 216 are installed to a fixed forming frame 210 with a fixing means such as bolts or the like. Preferably, the first jig 212 is fixedly installed while the second jig 216 is moveably installed. Also, a pressing means 218 is installed to a lower portion of the second jig 216 to press it to move the second jig 216.

As described above, the heat treatment jig 200 to which a wiper frame workpiece 220 is mounted is fed to a heating furnace for annealing. Accordingly, in a state where the wiper frame workpiece 200 is bent to have an approximate curvature between the first jig 212 and the second jig 216, the workpiece can be pressed and annealed at the same time.

Meanwhile, in order to improve the heat treatment performance of the heat treatment jig 200, a heating means (not shown) may be provided in the first and second jigs 212 and 216 or the forming frame 210.

Figure 9:
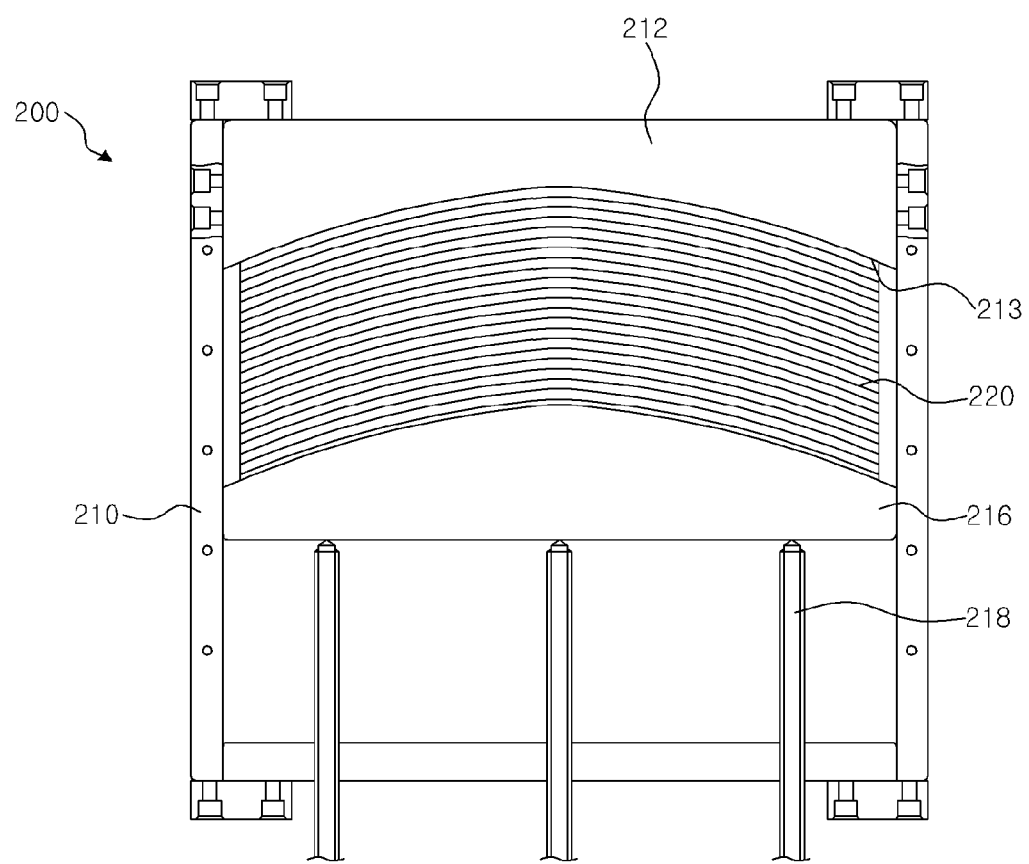
FIG. 9 is a view showing a state where the wiper frame is machined in the jig for heat treating a wiper frame according to the present invention.

A view showing a state where a plurality of wiper frames are machined in the jig heat treating a wiper frame according to the present invention is described with reference to FIG. 9.

First, the wiper frame workpiece 220, which has been subjected to the heating and cooling processes to have elasticity, is bent to have an approximate curvature by means of an additional machining apparatus.

Next, the wiper frame workpiece 220 bent to have the approximate curvature is mounted to the jig 200 for heat treating a wiper frame. At this time, the wiper frame workpiece 220 is disposed between the first and second jigs 212 and 216. Thereafter, in a state where the pressing means 218 is operated to cause the second jig 216 to press the wiper frame workpiece 220, the heat treatment jig 200 feeds the wiper frame workpiece 220 to the heating furnace (not shown), and the wiper frame workpiece 220 is then annealed.

Meanwhile, in a state where upper and lower surfaces of the wiper frame workpiece 220 is respectively pressed by the first and second working surfaces 213 and 217 of the first and second jigs 212 and 216, the wiper frame workpiece 220 is heated to an appropriate temperature to have a curvature which is the same as that of the first and second jigs 212 and 216 and to remove internal stress of the workpiece, thereby having a predetermined shape.

Accordingly, with the jig 220 for heat treating a wiper frame, the wiper frame workpiece 220 is formed to have a curvature corresponding to a specification of the article and to have a shape of the wiper frame.

In the meantime, in the jig 200 for heat treating a wiper frame, only one wiper frame workpiece 220 is put between the first jig 212 and the second jig 216 to be machined, or a plurality of wiper frame workpieces 220 can be put in a lump therebetween to be machined. To this end, as shown in FIG. 10, an auxiliary jig 230 may be installed between the plurality of wiper frame workpieces 220 so that the wiper frame workpieces have a desired curvature.

Figure 10:
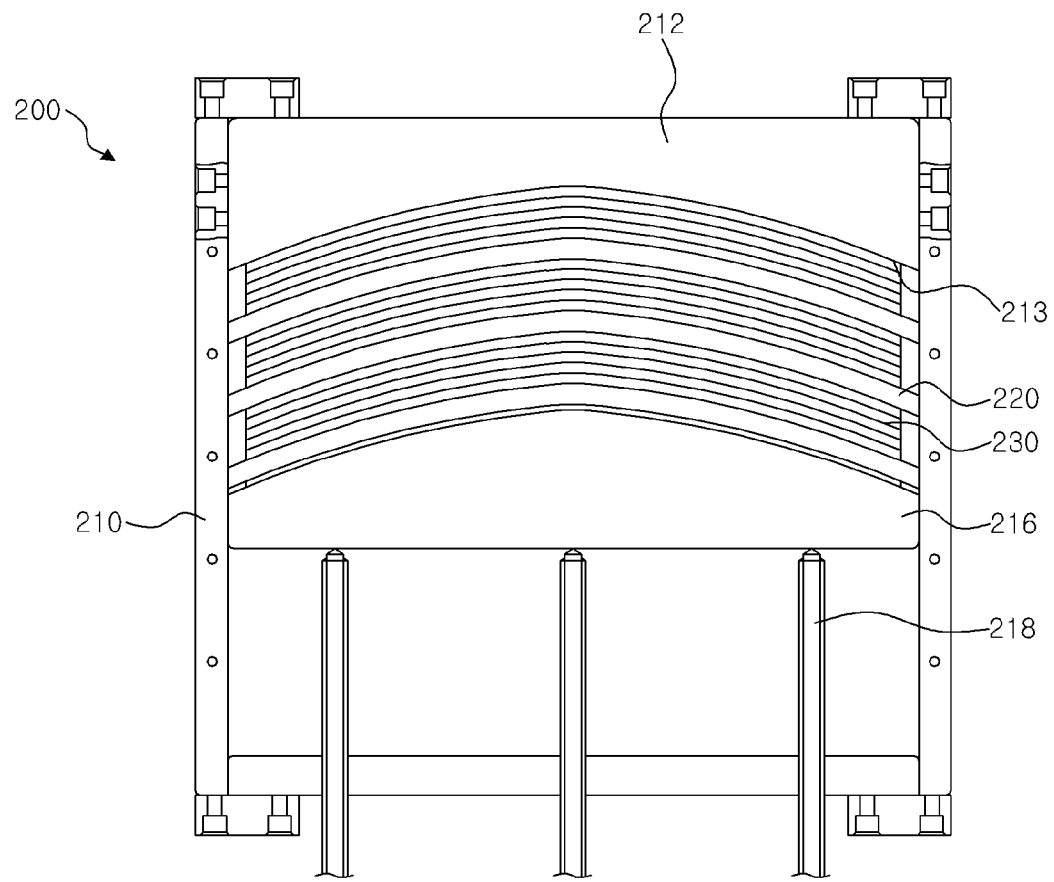
FIG. 10 is a view showing a state where a plurality of wiper frames are machined in the jig for heat treating a wiper frame according to the present invention.

FIG. 10 is a view showing a state where a plurality of the wiper frames are machined in the jig for heat treating a wiper frame according to the present invention. In the jig 200 for heat treating a wiper frame, if the number of the wiper frame workpieces 220 to be simultaneously formed is increased, it is preferred that the auxiliary jigs 230 having a curvature corresponding to the first and second working surfaces 213 and 217 be disposed between the wiper frame workpieces 220.

As described above, since the auxiliary jigs 230 are disposed between the wiper frame workpieces 220, it is possible to reduce a curvature error occurring when the plurality of wiper frame workpieces 220 are simultaneously formed.

In addition, a method for manufacturing the wiper frame of the wiper blade 50 according to the present invention is as follows.

The wiper frame 70 of the wiper blade 50 according to the present invention is made of a steel material. The structure and strength of the wiper frame can be varied depending on conditions of heat treatment of the steel material, so that the formed configuration of the wiper frame can be maintained continuously.

Figure 11:
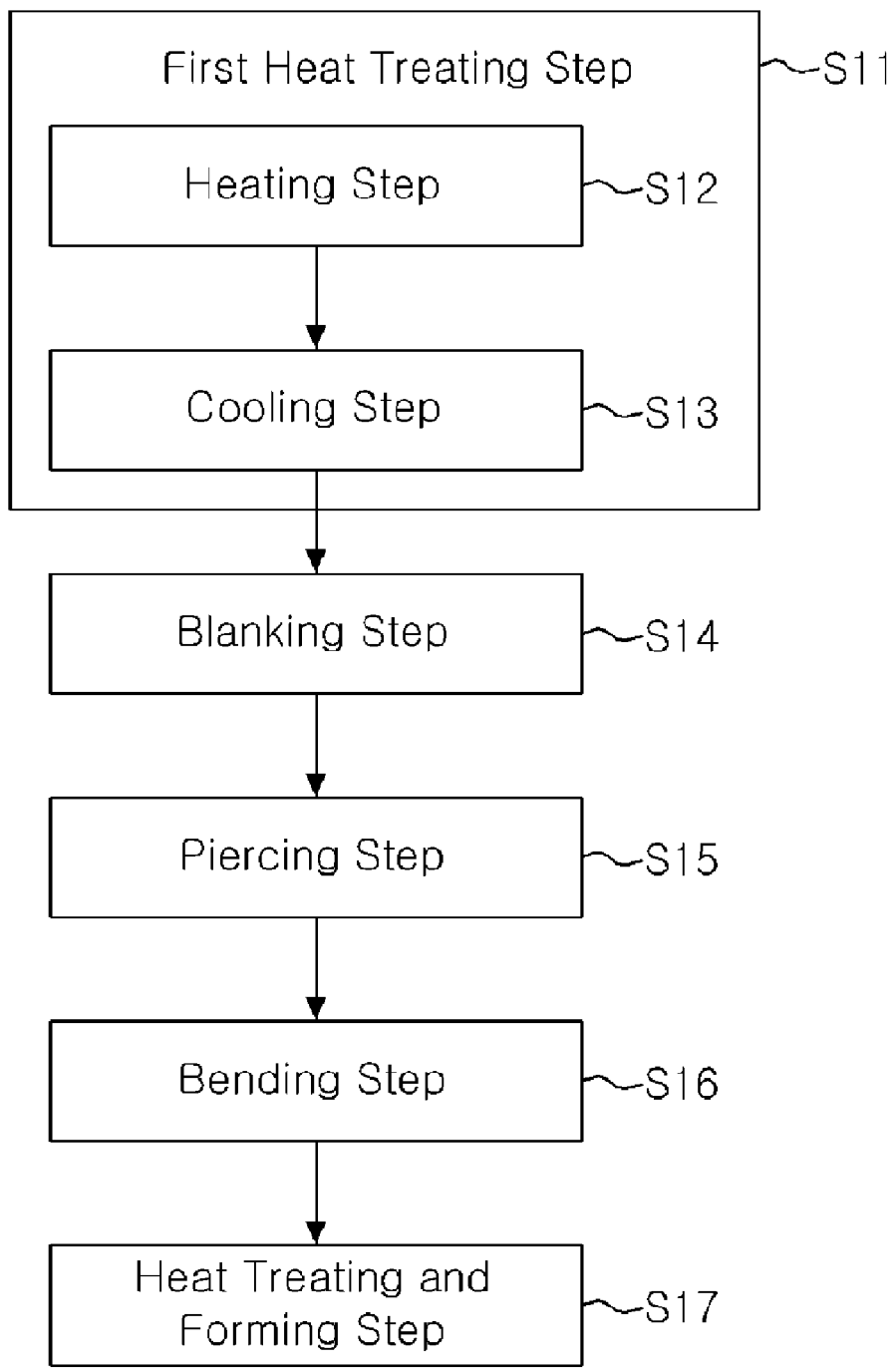
FIG. 11 is a flow chart illustrating a method for manufacturing the wiper frame of the wiper blade according to the present invention.

FIG. 11 is a flow chart illustrating a method for manufacturing the wiper frame 70 of the wiper blade 50 according to the present invention.

As shown in FIG. 11, the method for manufacturing the wiper frame 70 of the wiper blade 50 according to the present invention comprises a heat treating step S11 including a heating and cooling step, a blanking step S14, a piercing step S15, a bending step S16, and a heat treating and forming step S17.

The heat treating step S11, which is the step of heat treating a workpiece made of steel, comprises a heating step S12 of heating the workpiece to a transformation temperature or more and a cooling step S13 of rapidly cooling the workpiece heated in the heating step S12. If the workpiece is subjected to such steps, the structure of the workpiece is transformed into martensite.

The martensite obtained in the above process is a rigid structure which is formed when the transformation from austenite stable at high temperature to a structure composed of cementite and α-iron stable at room temperature is partially interrupted. Next, the blanking step S14 is to blank the workpiece, which has been heat treated in the heat treating step, according to a shape of the article. The blanked workpiece is machined into a wiper frame workpiece.

Once the wiper frame workpiece is prepared as described above, the wiper frame workpiece is subjected to the piercing step. At this time, unnecessary portions are removed from the wiper frame workpiece through the piercing step S15, thereby forming the coupling slits and the coupling aperture.

Next, the bending step S16 is to bend the wiper frame workpiece to have a predetermined curvature. In the step, the wiper frame workpiece is preformed by being bent through a separate tool to have an approximately bent shape.

Meanwhile, in the heat treating and forming step S17, the wiper frame workpiece is mounted to the jig for heat treating a wiper frame as described above. At this time, the wiper frame workpiece is mounted between the first and second jigs. The pressing means is operated to press the wiper frame workpiece, and at the same time, the heat treatment jig is fed into the heating furnace to anneal the wiper frame workpiece.

As described above, after being preformed in the bending step S16, the wiper frame workpiece is pressed by means of the first and second jigs and simultaneously annealed in the heat treating and forming step S17. Thus, the wiper frame workpiece is completely formed to have a desired curvature. At this time, when the wiper frame workpiece is subjected to the anneal process, the internal stress of the wiper frame workpiece increased in the bending step S16 is relieved and the internal structure becomes uniform, thereby completing the finished product.

INDUSTRIAL APPLICABILITY

Although the present invention is described with respect to certain preferred embodiment, it will be apparent in the art can make that various modifications, variations and changes may be made thereto within the spirit and scope of the invention defined by the claims. Therefore, the above descriptions and appended drawings are not intended to limit the technical spirit of the present, invention but should be analyzed as the exemplifications of the present invention.

The invention of the cliamed is:

1. A wiper blade coupled to a wiper arm of a vehicle to wipe a windshield, comprising:
    a wiper strip having rail grooves formed on opposing sides thereof;
    a wiper frame curved along its lengthwise direction and having elasticity to bring the wiper strip into contact with the windshield when the wiper blade is installed on the vehicle, an area of a side of the wiper frame increasing from ends of the wiper frame toward a center portion, and decreasing closer to the center portion;
    a pair of coupling slits formed in the wiper frame, the rail grooves of the wiper strip configured to slidably engage the coupling slits;
    a connector attached at one face of the wiper frame to be coipled with the wiper arm;
    a seating portion for guiding a connecting position of the connector, formed in the wiper frame at the center portion, a width of the seating portion being narrower than a width of the wiper frame at the ends thereof; and
    a coupling aperture formed in one end of the coupling slit and allow a first portion and a second pertion of the wiper strip to be inserted into a respective one of the coupling apertures, a first one of the coupling apertures located at an end portion of the wiper frame and a second one of the coupling apertures located at the center portion of the wiper frame.

2. The wiper blade as claimed in claim 1, wherein the wiper slit is formed corresponding to the coupling slit.

3. The wiper blade as claimed in claim 2, wherein any one of a through-hole and a protrusion is formed between the coupling slits, and the other one of the through-hole and the protrusion is formed in an upper end of the wiper strip to be inserted thereinto.

4. The wiper blade as claimed in any one of claims 1 to 3, wherein the wiper frame comprises an auxiliary slit connected to the first one of the coupling aperture, the auxiliary slit being formed collinearly with the coupling slit.

5. The wiper blade as claimed in any one of claims 1 to 3, wherein a portion of the coupling aperture that is formed to be inclined in a fitting direction of the wiper strip.

6. The wiper blade as claimed in any one of claims 1 to 3, wherein the wiper frame is arranged to be inclined at a predetermined angle, with respect to the windsheild when coulped to the wiper arm so that the wiper strip is brought into closer contact with the windsheild by operation of wind against the increased area of the wiper frame, and the wiper strip includes a body pertion formed at an incline with respect to a width direction of the wiper strip such that the wiper strip is brought into perpendicular contact with the windshield when installed on the vechicle.

7. The wiper blade as claimed in claim 6, wherein the connector has a lower surface formed to be inclined in a direction corresponding to the inclination direction of the wiper frame.

8. A windshield wiper blade, comprising:
    a wiper frame having first and second sides separated by a plurality of coupling slits extending longitudinally in the wiper frame, one side of the wiper frame having a width that increases from ends of the wiper frame toward a center portion thereof;

a connector coupled to the wiper frame and configured to connect the wiper blade to a wiper arm of a vehicle, and to support the wiper frame, relative to the wiper arm, at an inclined angle selected so that the wiper blade is brought into closer contact with a windshield by wind contacting the wiper frame; and the wiper strip having a rail groove on each side thereof configured to slidably engage the plurality of coupling slits of the wiper frame, the wiper strip including a contact portion configured to contact the windshield, the contact portion of the wiper strip being inclined, relative to the rail grooves, in a direction opposite an incline of the connector so that the contact portion is brought into perpendicular contact with the windshield.

9. The wiper blade of claim 8 wherein the wiper frame is curved along its lengthwise direction and has elasticity to urge the wiper strip into contact with the windshield when the wiper blade is installed on a vehicle.

10. The wiper blade of claim 8 wherein the connector is coupled directly to the wiper frame at the center portion thereof.

* * * * *